US009533570B2

(12) United States Patent
Matsuda et al.

(10) Patent No.: US 9,533,570 B2
(45) Date of Patent: Jan. 3, 2017

(54) ELECTRIC VEHICLE

(71) Applicant: KAWASAKI JUKOGYO KABUSHIKI KAISHA, Kobe-shi, Hyogo (JP)

(72) Inventors: Yoshimoto Matsuda, Kobe (JP); Takuma Nozaki, Aioi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 22 days.

(21) Appl. No.: 14/434,720

(22) PCT Filed: Oct. 10, 2012

(86) PCT No.: PCT/JP2012/006491
§ 371 (c)(1),
(2) Date: Apr. 9, 2015

(87) PCT Pub. No.: WO2014/057514
PCT Pub. Date: Apr. 17, 2014

(65) Prior Publication Data
US 2015/0274013 A1    Oct. 1, 2015

(51) Int. Cl.
*B60K 1/04*     (2006.01)
*B60K 17/356*   (2006.01)
(Continued)

(52) U.S. Cl.
CPC .............. *B60K 17/356* (2013.01); *B60K 1/04* (2013.01); *B60K 11/06* (2013.01); *B60K 17/165* (2013.01);
(Continued)

(58) Field of Classification Search
None
See application file for complete search history.

(56) References Cited

U.S. PATENT DOCUMENTS 5,984,034 A * 11/1999 Morisawa ................ B60K 6/48
180/65.28
7,306,064 B2 * 12/2007 Imazu .................... B60K 6/365
180/65.285
(Continued)

FOREIGN PATENT DOCUMENTS

JP       60076410 A  *  4/1985
JP       07089355 A     4/1995
(Continued)

OTHER PUBLICATIONS

ISA Japanese Patent Office, International Search Report Issued in International Application No. PCT/JP2012/006491, Dec. 11, 2012, WIPO, 2 pages.

*Primary Examiner* — Katy M Ebner
(74) *Attorney, Agent, or Firm* — Alleman Hall McCoy Russell & Tuttle LLP (57) ABSTRACT

An electric vehicle according to the present invention includes: an electric motor configured to generate driving force to rotate left and right driving wheels; a battery as a power supply for the electric motor; an inverter configured to supply AC power to the electric motor; a differential device arranged between the left and right driving wheels; and a driving power transmission configured to transmit the driving force, generated by the electric motor, to the differential device. The differential device, the driving power transmission, and the electric motor are lined up linearly in a vehicle width direction. The electric motor is located at a first vehicle width direction side of a vehicle width center of the vehicle. The inverter is located at the first vehicle width direction side of the vehicle width center of the vehicle.

15 Claims, 3 Drawing Sheets

(51) Int. Cl.
*B60L 11/18* (2006.01)
*B60K 11/06* (2006.01)
*B60K 17/16* (2006.01)
*B60L 15/00* (2006.01)
*B62D 33/02* (2006.01)
*B60L 1/00* (2006.01)
*B60L 3/00* (2006.01)
*B60K 1/00* (2006.01)

(52) U.S. Cl.
CPC ............... *B60L 1/003* (2013.01); *B60L 3/003* (2013.01); *B60L 11/1803* (2013.01); *B60L 11/1816* (2013.01); *B60L 11/1864* (2013.01); *B60L 11/1874* (2013.01); *B60L 11/1877* (2013.01); *B60L 15/007* (2013.01); *B62D 33/02* (2013.01); *B60K 1/00* (2013.01); *B60K 2001/001* (2013.01); *B60K 2001/005* (2013.01); *B60K 2001/0405* (2013.01); *B60L 2200/36* (2013.01); *B60L 2240/36* (2013.01); *B60L 2270/145* (2013.01); *B60Y 2200/141* (2013.01); *Y02T 10/645* (2013.01); *Y02T 10/7005* (2013.01); *Y02T 10/7061* (2013.01); *Y02T 10/7072* (2013.01); *Y02T 90/14* (2013.01)

(56) References Cited

U.S. PATENT DOCUMENTS

| 8,061,464 B2* | 11/2011 | Boesch | B60K 6/365 180/197 |
|---|---|---|---|
| 8,348,800 B2* | 1/2013 | Tanaka | B60K 1/00 475/160 |
| 8,448,542 B2* | 5/2013 | Nagamori | B60K 6/46 477/3 |
| 8,678,969 B2* | 3/2014 | Sato | F16H 3/093 475/150 |
| 8,738,207 B2* | 5/2014 | Holmes | B60K 6/24 180/65.265 |
| 8,858,391 B2* | 10/2014 | Tolkacz | B60K 17/02 180/65.22 |
| 8,899,360 B2* | 12/2014 | Mochizuki | B60R 16/0215 180/65.1 |
| 8,936,120 B2* | 1/2015 | Takagi | B60K 6/48 180/291 |
| 8,937,401 B2* | 1/2015 | Campbell | H05K 9/002 180/65.22 |
| 9,018,793 B2* | 4/2015 | Tanahashi | H02G 3/00 307/9.1 |
| 9,033,851 B2* | 5/2015 | Itakura | F16D 21/04 192/45.006 |
| 9,080,670 B2* | 7/2015 | Komatsu | F16H 61/32 |
| 9,096,133 B2* | 8/2015 | Kohler | B60L 11/126 |
| 2013/0192400 A1* | 8/2013 | Dodo | B60K 1/00 74/421 A |
| 2013/0220718 A1* | 8/2013 | Gotou | B60K 1/00 180/65.6 |

FOREIGN PATENT DOCUMENTS

| JP | 11180162 A | 7/1999 |
|---|---|---|
| JP | 2001287550 A | 10/2001 |
| JP | 2003116282 A | 4/2003 |
| JP | 2005047489 A | 2/2005 |
| JP | 2006054982 A | 2/2006 |
| JP | 2011073582 A | 4/2011 |

* cited by examiner

ELECTRIC VEHICLE

TECHNICAL FIELD

The present invention relates to an electric vehicle including an electric motor configured to rotate left and right driving wheels.

BACKGROUND ART

As disclosed in PTL 1, in an electric vehicle, such as an electric four-wheeled vehicle, including left and right driving wheels, driving force generated by an electric motor is transmitted to the left and right driving wheels via a differential device. The electric vehicle is equipped with various electric devices, such as a battery and an inverter, for driving the electric motor.

CITATION LIST

Patent Literature

PTL 1: Japanese Laid-Open Patent Application Publication No. 2011-73582

SUMMARY OF INVENTION

Technical Problem

In a case where a power unit including an electric motor, a differential device, and the like increases in size, a space for arranging the electric devices cannot be adequately secured. In such a case, wires connecting the electric devices to one another become too long, and this increases the complexity of wire connecting work.

An object of the present invention is to compactly arrange the power unit of the electric vehicle and shorten the wires connecting the electric devices of the electric vehicle to one another.

Solution to Problem

The present invention was made to achieve the above object, and an electric vehicle according to the present invention includes: an electric motor configured to generate driving force to rotate left and right driving wheels; a battery as a power supply for the electric motor; an inverter configured to supply AC power to the electric motor; a differential device arranged between the left and right driving wheels; and a driving power transmission configured to transmit the driving force, generated by the electric motor, to the differential device, wherein: the differential device, the driving power transmission, and the electric motor are lined up linearly in a vehicle width direction; the electric motor is located at a first vehicle width direction side of a vehicle width center of the vehicle; and the inverter is located at the first vehicle width direction side of the vehicle width center of the vehicle.

According to the above configuration, a unit (hereinafter also referred to as a "power unit") constituted by the differential device, the driving power transmission, and the electric motor is compactly arranged in the forward and rearward direction. The electric motor is arranged so as to be spaced apart from the differential device in the vehicle width direction and is located at the first vehicle width direction side of the vehicle width center of the vehicle. The inverter is also located at the first vehicle width direction side. Therefore, a wire which connects the inverter to the electric motor and through which AC is supplied from the inverter to the electric motor can be shortened.

The electric vehicle may be configured such that the battery is adjacent to the electric motor in a forward and rearward direction and adjacent to the inverter in the vehicle width direction.

Since the power unit is arranged linearly in the vehicle width direction, a relatively large space is secured in front of or behind the power unit. In addition, since the inverter is located at the first vehicle width direction side together with the electric motor, a relatively large space is secured at the second vehicle width direction side of the inverter. In a case where the battery is provided adjacent to the electric motor in the forward and rearward direction and adjacent to the inverter in the vehicle width direction, the battery can be arranged in a relatively large space. Therefore, the battery can be increased in size.

The electric vehicle may be configured such that: at least a part of the inverter projects further toward the first vehicle width direction side than an inner surface of a driving wheel located at the first vehicle width direction side, out of the left and right driving wheels; and the battery is located at a second vehicle width direction side of the inverter, is adjacent to the inverter, and is arranged between the left and right driving wheels in the vehicle width direction.

According to the above configuration, since the inverter is provided away from the vehicle width center of the vehicle toward the first vehicle width direction side (i.e., a vehicle width direction outer side), a space for arranging the battery can be largely secured at the second vehicle width direction side of the inverter. Therefore, the battery can be increased in size.

The electric vehicle may further include: an additional wheel spaced apart from the left and right driving wheels in a forward and rearward direction; a power distributer configured to distribute the driving force, generated by the electric motor, to the additional wheel; and a drive shaft through which the driving force is transferred from the power distributer to the additional wheel, wherein: the power distributer is arranged at a second vehicle width direction side of the differential device; and the drive shaft is located at a second vehicle width direction side of the vehicle width center and extends in the forward and rearward direction from the power distributer toward the additional wheel.

According to the above configuration, the vehicle can travel by driving the additional wheel which is spaced apart from the left and right driving wheels in the forward and rearward direction. Therefore, the drive shaft is provided. The drive shaft is provided at a vehicle width direction side opposite to the vehicle width direction side where the electric motor and the inverter are arranged. The drive shaft extends in the forward and rearward direction. Therefore, it is unnecessary to consider a case where the drive shaft interferes with the power unit, the inverter, and the wires connecting the power unit and the inverter with each other, and the degree of freedom of the arrangement of the drive shaft increases. In a case where the battery is provided adjacent to the power unit and the inverter, it is easy to arrange the drive shaft such that the drive shaft does not interfere with the battery.

The electric vehicle may be configured such that the left and right driving wheels are connected to a vehicle body via leaf springs respectively located at both vehicle width direction sides and extending in the forward and rearward direction.

According to the above configuration, a larger space can be secured at a region around the left and right driving wheels, especially at a region between the left and right driving wheels and a region above the driving wheels, than, for example, a case where coil spring type suspensions are respectively provided between the vehicle body and the left driving wheel and between the vehicle body and the right driving wheel. Therefore, the layout of providing the power unit and the inverter at the first vehicle width direction side of the vehicle width center of the vehicle and arranging the power unit linearly in the vehicle width direction can be easily realized.

The electric vehicle may be such that: the left and right driving wheels are left and right rear wheels; a front end of the electric motor is located in a vicinity of front end portions of the rear wheels; and a rear end of the battery is located in the vicinity of the front end portions of the rear wheels.

According to the above configuration, the entire electric motor or most of the electric motor is arranged in a space behind the front end portions of the left and right rear wheels, and the power unit and the left and right driving wheels are compactly arranged in the forward and rearward direction. With this, a large space is secured in front of the rear wheels. Since the front end of the battery is located in the vicinity of the front end portions of the rear wheels, this space is effectively utilized for the arrangement of the battery. As above, since the battery is provided close to the power unit, the battery and the power unit are compactly arranged in the forward and rearward direction, so that the battery can be increased in size.

The electric vehicle may further include a cooling air line through which cooling air flows toward the battery in the vehicle width direction.

According to the above configuration, the battery can be cooled down by the air, so that the performance degradation of the battery can be suppressed.

The electric vehicle may be configured such that: the cooling air flows along the cooling air line from a second vehicle width direction side to the first vehicle width direction side; the inverter is located at a first vehicle width direction side of the battery and is adjacent to the battery; and the inverter is arranged at a downwind side of the battery in a flow direction of the cooling air.

According to the above configuration, the inverter can be cooled down by using the cooling air for cooling down the battery. Since the inverter is arranged at a downwind side of the battery, the wind heated by the inverter is prevented from being blown to the battery, so that the performance degradation of the battery can be suppressed.

The electric vehicle may be configured such that an electric component is arranged at the first vehicle width direction side of the battery and is adjacent to the inverter.

According to the above configuration, the electric component can be cooled down together with the inverter by using the cooling air for cooling down the battery.

Advantageous Effects of Invention

As is clear from the above explanations, according to the present invention, the power unit of the electric vehicle can be compactly arranged, and the wires connecting the electric devices of the electric vehicle to one another can be shortened.

DESCRIPTION OF EMBODIMENTS

Hereinafter, an embodiment of the present invention will be explained in reference to the drawings. In the drawings, the same reference signs are used for the same or corresponding components, and a repetition of the same explanation is avoided. The directions described below are from the perspective of a driver of an electric four-wheeled vehicle. A rightward and leftward direction corresponds to a vehicle width direction, and a forward and rearward direction corresponds to a vehicle length direction.

Figure 1:
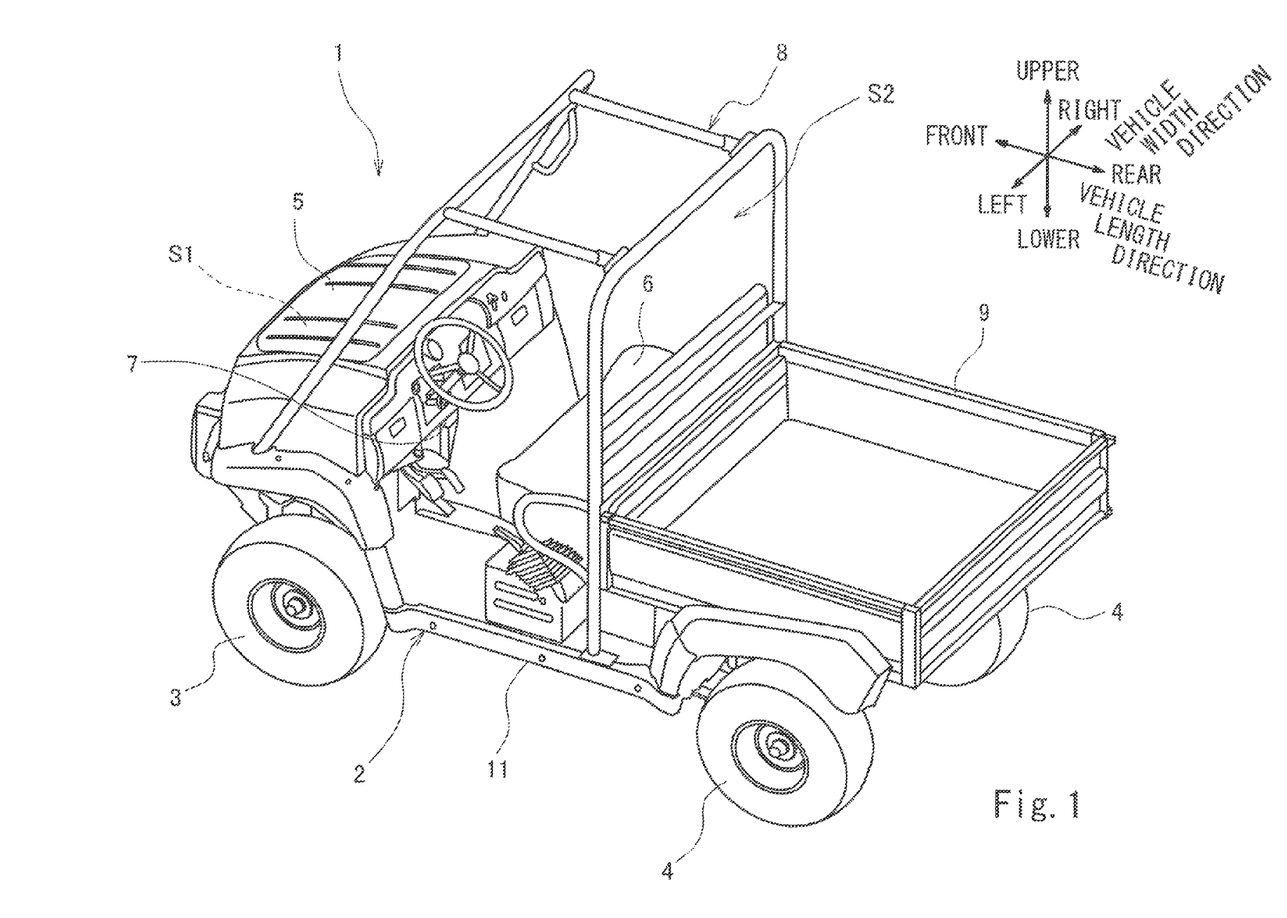
FIG. 1 is a perspective view showing a utility vehicle according to an embodiment of the present invention.

FIG. 1 is a perspective view showing a utility vehicle 1 according to an embodiment of the present invention. As shown in FIG. 1, the utility vehicle 1 is an electric vehicle which does not include an internal combustion engine and is configured such that rotational power is generated from a power supply, which supplies electric power, to drive wheels. The utility vehicle 1 includes: a pair of left and right front wheels 3 arranged at a front portion of a vehicle body 2; and a pair of left and right rear wheels 4 arranged at a rear portion of the vehicle body 2. The front wheels 3 and the rear wheels 4 respectively include so-called balloon tires. A front space S1 between the left and right front wheels 3 is covered with a hood 5 from above. A laterally long seat 6 on which a driver and a passenger are seated is provided in a vicinity of a middle portion of the vehicle body in the forward and rearward direction located behind the hood 5. The vehicle body 2 is provided with a dashboard 7 which separates the front space S1 and a boarding space S2 in which the seat 6 is arranged. The vehicle body 2 is provided with a cabin frame 8 (ROPS) which extends from left and right sides of the hood 5 to floor frames 11 at obliquely rear lower sides of the seat 6 and surrounds the boarding space S2 in which the seat 6 is arranged.

The cabin frame 8 is a metal cylindrical pipe and is formed to open front, rear, left, right, and upper portions of the boarding space S2. The vehicle body 2 is provided with a cargo bed 9 located behind the boarding space S2. The cargo bed 9 includes: a bottom wall which is square in plan view; and side walls projecting upward from four sides of the bottom wall. The cargo bed is open upward. The cargo bed 9 can bank manually or automatically so as to incline rearward.

Figure 2:
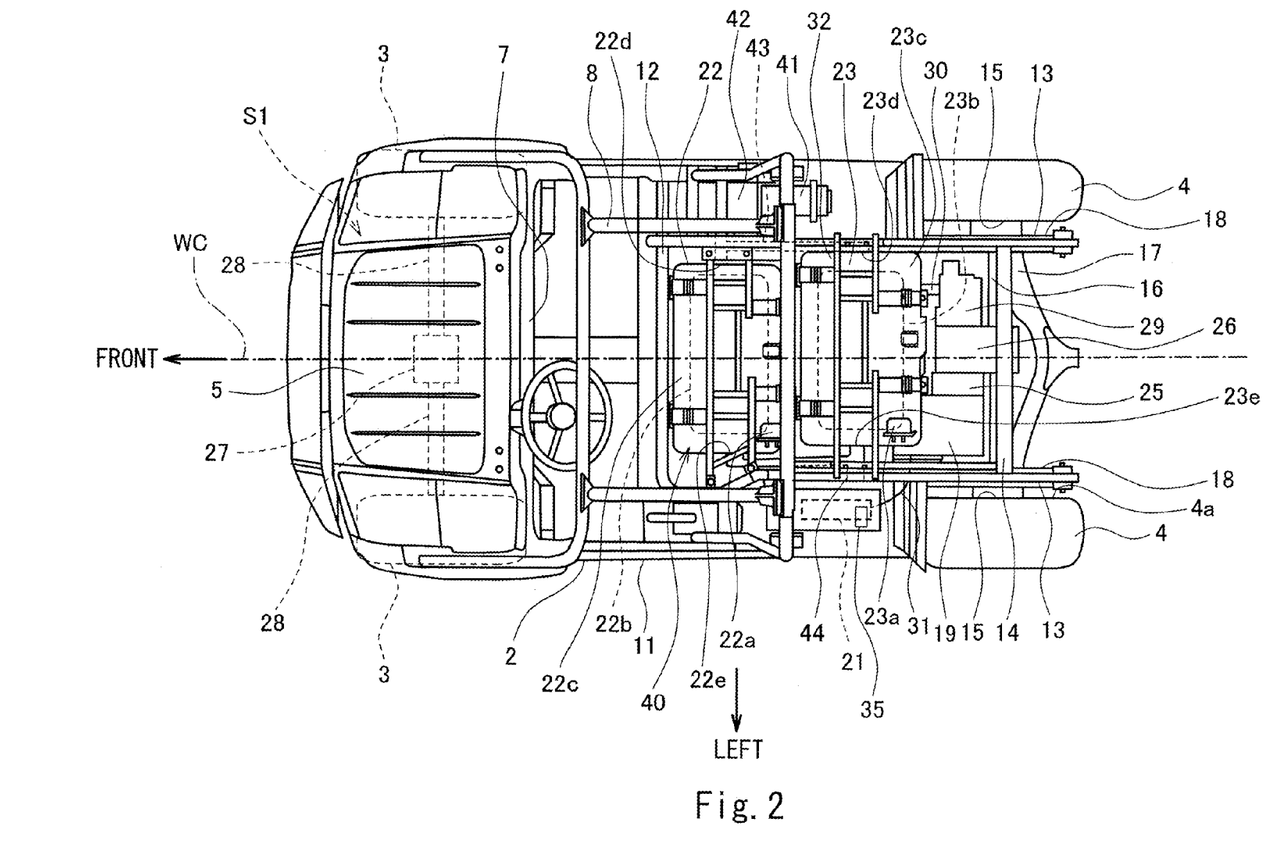
FIG. 2 is a plan view showing the utility vehicle of FIG. 1.

FIG. 2 is a plan view showing the utility vehicle 1 of FIG. 1. FIG. 2 shows a state where the seat 6 and the cargo bed 9 (see FIG. 1) are detached. As shown in FIG. 2, the vehicle body 2 includes a seat frame 12 which supports the seat 6 (see FIG. 1) from below. Front end portions of a pair of left and right rear frames 13 extending in the forward and rearward direction are connected to the seat frame 12. The rear frames 13 support the cargo bed 9 (see FIG. 1) from below. Rear portions of the left and right rear frames 13 are connected to each other by a cross member 14 extending in the vehicle width direction. Axles 16 extending in the vehicle width direction are respectively connected to the rear wheels 4. A coupling member 17 coupling hubs 15 of the left and right rear wheels 4 in a rightward and leftward direction is located behind the axles 16 and extends in the vehicle width direction.

A pair of left and right leaf springs 18 extending in the forward and rearward direction are respectively provided at lower surfaces of the left and right rear frames 13. The leaf springs 18 are plate springs. The leaf springs 18 are respectively arranged at outer side portions of the vehicle body 2 in the vehicle width direction and are bent downward. Both end portions of each of the leaf springs 18 in the forward and rearward direction are fixed to the corresponding rear frame 13. Middle portions (i.e., downward bent portions) of the leaf springs 18 in the forward and rearward direction are respectively coupled to outer surfaces of hubs 15 arranged under the rear frames 13. As above, the left and right rear wheels 4 are coupled to the vehicle body 2 (specifically, the rear frames 13) via the hubs 15 and the leaf springs 18. With this, vibrations and impacts transmitted from the road surface to the rear wheels 4 are absorbed by the leaf springs 18.

The vehicle body 2 is provided with: an electric motor 19 configured to generate driving force for driving the rear wheels 4 (and the front wheels 3 at the time of four-wheel driving); an inverter 21 configured to control the electric motor 19; and first and second battery units 22 and 23 configured to store electric power supplied to the inverter 21. The battery unit 22 includes a charging port 22a to which an external charging connector (not shown) is connected, and the charging port 22a is located on an outer surface (in the present embodiment, an upper surface) of a left portion of the battery unit 22. The battery unit 23 includes a charging port 23a to which the external charging connector (not shown) is connected, and the charging port 23a is located on an outer surface (in the present embodiment, an upper surface) of a left portion of the battery unit 23. The electric motor 19, the inverter 21, and the first and second battery units 22 and 23 are provided behind the dashboard 7.

The electric components 19, 21, and 23, except for the first battery unit 22, are arranged behind the cabin frame 8 and under the cargo bed 9 (see FIG. 1). The first battery unit 22 is arranged in a space surrounded by the seat frame 12 located under the seat 6 (see FIG. 1).

A driving power transmission 25 is connected to the electric motor 19, and a first differential device 26 is connected to the driving power transmission 25. The driving power transmission 25 changes the speed of the driving force, generated by the electric motor 19, to transmit the driving force to the first differential device 26. The driving power transmission 25 is, for example, a CVT (Continuously Variable Transmission) or may be another transmission mechanism. The driving power transmission 25 may be just a reducer configured to reduce the speed of the driving force, generated by the electric motor 19, at a predetermined reduction ratio or may be a combination of a transmission mechanism and a simple speed reduction mechanism. To switch a traveling direction of the vehicle, the driving power transmission 25 may include a forward and rearward travel switching mechanism configured to switch the rotational direction of an output shaft (not shown) of the driving power transmission 25. The first differential device 26 is arranged between the left and right rear wheels 4 in the vehicle width direction and accommodates a differential gear (not shown). An input of the differential gear is connected to the output shaft of the driving power transmission 25. Left and right outputs of the differential gear form a pair, and the pair of outputs are respectively connected to the left and right axles 16.

According to the utility vehicle 1 configured as above, the electric power stored in the first and second battery units 22 and 23 is converted into AC by the inverter 21, and the AC is supplied from the inverter 21 to the electric motor 19. Thus, the electric motor 19 generates the driving force. The driving force generated by the electric motor 19 is transmitted to the left and right rear wheels 4 through the driving power transmission 25, the first differential device 26, and the left and right axles 16. With this, the rear wheels 4 are rotated.

A second differential device 27 is arranged between the left and right front wheels 3 in the vehicle width direction, and the left and right front wheels 3 are connected to the second differential device 27 via a pair of left and right axles 28. The second differential device 27 is accommodated in the front space S1 and is located on a center line (which may hereinafter be referred to as a "vehicle width center WC") in the vehicle width direction in a plan view.

A power distributer 29 is connected to the first differential device 26, and the power distributer 29 is connected to the second differential device 27 via a drive shaft 30. The drive shaft 30 extends in the forward and rearward direction so as to connect the first and second differential devices 26 and 27, spaced apart from each other in the forward and rearward direction, with each other. With this, the driving force transmitted from the driving power transmission 25 to the first differential device 26 is also distributed to the front wheels 3 via the power distributer 29, the drive shaft 30, the second differential device 27, and the left and right axles 28. The power distributer 29 includes a clutch (not shown) which switches to determine whether to distribute the driving force to the front wheels 3. Thus, by the operation of the clutch, the power distributer 29 can switch between a state where only the rear wheels 4 are driven and a state where the four wheels 3 and 4 are driven.

Hereinafter, the arrangement of the first differential device 26, the driving power transmission 25, the electric motor 19, and peripheral components and devices will be explained in reference to FIG. 2. In the following explanations, a unit constituted by the first differential device 26, the driving power transmission 25, and the electric motor 19 may be called a "power unit".

As shown in FIG. 2, the first differential device 26 is arranged between the left and right rear wheels 3 in the vehicle width direction and located on the vehicle width center WC. The first differential device 26 includes a portion projecting to a front side of the axles 16 in a plan view, and the driving power transmission 25 is connected to a first vehicle width direction side (in the present embodiment, a left side) of this portion. The electric motor 19 is connected to the first vehicle width direction side (in the present embodiment, the left side) of the driving power transmission 25.

As above, the first differential device 26, the driving power transmission 25, and the electric motor 19 are lined up linearly in the vehicle width direction and arranged in this order from the vehicle width center WC toward the first vehicle width direction side (in the present embodiment, the left side). Therefore, the power unit is compactly arranged in the forward and rearward direction and the upper-lower direction. The driving power transmission 25 and the electric motor 19 are arranged in front of the left axle 16 and are adjacent to the left axle 16 in the forward and rearward direction.

The first differential device 26 is located on the vehicle width center WC. The electric motor 19 is arranged such that the driving power transmission 25 is sandwiched between the electric motor 19 and the first differential device 26 in the vehicle width direction. The electric motor 19 is spaced apart from the first differential device 26 in the vehicle width direction. Therefore, the electric motor 19 is located at the first vehicle width direction side (in the present embodiment, the left side) of the vehicle width center WC.

To arrange the electric motor 19 as above, an output shaft (not shown) of the electric motor 19 is directed to the vehicle width direction and projects toward a second vehicle width direction side (in the present embodiment, a right side) to be connected to an input of the driving power transmission 25. By arranging the shaft as above, the power unit is easily arranged such that a longitudinal direction thereof corresponds to the vehicle width direction. As described above, the present embodiment adopts the leaf springs 18 as absorbers for the rear wheels 4. The leaf springs 18 are respectively arranged at the outer side portions of the vehicle body 2 in the vehicle width direction and extend in the forward and rearward direction. In the present embodiment, the leaf springs 18 respectively overlap the rear frames 13 in a plan view and extend in the forward and rearward direction, and the amount of projection of each leaf spring 18 from the rear frame 13 in the vehicle width direction is small. Therefore, a large space can be secured in a vehicle width direction at an inner side of the leaf springs 18. In particular, a larger space can be secured at a region around the rear wheels 4, especially a region between the left and right rear wheels 3 and a region above the rear wheels 3 than in a case where coil springs are adopted as the absorbers. Therefore, the layout of arranging the power unit linearly in the vehicle width direction and providing the electric motor 19 at the first vehicle width direction side can be easily realized, and the electric motor 19 can be provided close to the rear frame 13.

Then, the inverter 21 is located at the first vehicle width direction side (in the present embodiment, the left side) of the vehicle width center WC, that is, at the same side as the electric motor 19. In the present embodiment, the inverter 21 is arranged in front of the electric motor 19 and is adjacent to the electric motor 19 in the forward and rearward direction. The inverter 21 is arranged in front of the rear wheels 4. Therefore, a wire 31 connecting the inverter 21 to the electric motor 19 can be shortened. Thus, the work of connecting this wire is facilitated, and the occurrence of a voltage drop and the generation of a surge current between the inverter 21 and the electric motor 19 can be suppressed. Since the wire 31 extends from a rear surface of the inverter 21, which faces the electric motor 19, the wire 31 can be satisfactorily shortened. In the present embodiment, since the inverter 21, the electric motor 19, and the battery units 22 and 23 are arranged behind the dashboard 7, the wires do not have to be arranged so as to extend across the dashboard 7. Thus, the wire connecting work is facilitated, and the wires can be shortened.

Since the power unit is arranged linearly in the vehicle width direction, a relatively large space is secured in front of or behind the power unit. In the present embodiment, as described above, the driving power transmission 25 and the electric motor 19 are located in front of and adjacent to the axle 16 located at the first vehicle width direction side (in the present embodiment, the left side). Therefore, a large space is secured in front of the power unit. Since the inverter 21 is located at the first vehicle width direction side (in the present embodiment, the left side) together with the electric motor 19, the inverter 21 is adjacent to the electric motor 19 in the forward and rearward direction, and the space secured in front of the power unit is prevented from being occupied by the inverter 21 as much as possible.

As above, a large space is secured in front of the power unit and at the second vehicle width direction side (in the present embodiment, the right side) of the inverter 21. The second battery unit 23 is adjacent to the electric motor 19 in the forward and rearward direction and adjacent to the inverter 21 in the vehicle width direction. To be specific, the second battery unit 23 is accommodated in a space surrounded by the power unit and the inverter 21. Since this space is made large by the linear layout of the power unit and the arrangement of the inverter 21 at the first vehicle width direction side, the second battery unit 23 can be easily increased in size, and therefore, a cruising distance of the utility vehicle 1 increases.

Especially, in the present embodiment, substantially the entire inverter 21 projects to the first vehicle width direction side (in the present embodiment, the left side) of an inner surface 4a of the rear wheel 4 located at the first vehicle width direction side (in the present embodiment, the left side). The entire inverter 21 is arranged at the first vehicle width direction side (in the present embodiment, the left side) of the rear frame 13 located at the first vehicle width direction side (in the present embodiment, the left side). As above, a space surrounded by the power unit and the left and right rear frames 13 is not utilized for the arrangement of the inverter 21. Thus, this space is entirely utilized for the arrangement of the second battery unit 23. Therefore, the second battery unit 23 can be easily increased in size, and the work of attaching the second battery unit 23 to this space is facilitated since it is unnecessary to consider the interference of the second battery unit 23 with the other components or devices. The second battery unit 23 is easily supported by the rear frames 13 by using a metal frame 32 extending in a beam shape in a leftward and rightward direction. Therefore, even in a case where the second battery unit 23 is large and heavy, the second battery unit 23 can be stably supported by the vehicle body 2.

Further, a front end of the power unit is located in the vicinity of front end portions of the rear wheels 4. To be specific, the entire power unit or most of the power unit is arranged in a space behind the front ends of the rear wheels 4, so that a space in front of the power unit can be increased in size as much as possible in the forward and rearward direction. Then, a rear end of the second battery unit 23 is located in the vicinity of the front end portions of the rear wheels 4. To be specific, the second battery unit 23 is arranged so as to effectively utilize the largely secured space in the forward and rearward direction. As above, the power unit compactly arranged in the forward and rearward direction is arranged at a rear side as much as possible, and the second battery unit 23 is provided close to the power unit in the forward and rearward direction. With this, the second battery unit 23 can be satisfactorily increased in size in the forward and rearward direction.

As above, the battery units 22 and 23 are arranged between the front wheels 3 and the rear wheels 4 in the forward and rearward direction and arranged at a middle portion of the entire vehicle in the forward and rearward direction. Therefore, a center of gravity of the vehicle can be easily positioned at the forward and rearward direction middle portion, so that traveling stability can be improved. In addition, the entire power unit or most of the power unit is arranged in front of the axles 16 of the rear wheels 4, so that the interference between the cargo bed 9 and the power unit when the cargo bed 9 banks can be prevented.

On the other hand, the power distributer 29 is connected to the second vehicle width direction side (in the present embodiment, the right side) of the first differential device 26 and is located at the second vehicle width direction side (in the present embodiment, the right side) of the vehicle width center WC. Therefore, the drive shaft 30 is provided in a region located at the second vehicle width direction side (in the present embodiment, the right side) of the vehicle width center WC and extends in the forward and rearward direction from the power distributer 29 toward the front wheels 3 (specifically, toward the second differential device 27). Since the power distributer 29 is arranged as above, it is unnecessary to consider a case where the drive shaft 30 interferes with the driving power transmission 25, the electric motor 19, the inverter 21, the wire between the electric motor 19 and the inverter 21, and the like. Thus, the degree of freedom of the arrangement of the drive shaft 30 increases. In the present embodiment, the power distributer 29 is also arranged linearly together with the first differential device 26, the driving power transmission 25, and the electric motor 19 in the vehicle width direction. With this, the drive shaft 30 can be arranged at the second vehicle width direction side (in the present embodiment, the right side) of the vehicle width center WC so as to be as far away from the vehicle width center WC as possible.

In the present embodiment, the first battery unit 22 includes a battery 22b and a casing 22c accommodating the battery 22b. Similarly, the second battery unit 23 includes a battery 23b and a casing 23c. The utility vehicle 1 includes a cooling air line 40 through which cooling air flows toward the battery 22b in the casing 22c and the battery 23b in the casing 23c. The casing 22c includes: an inlet 22d through which the cooling air flows into the casing 22c; and an outlet 22e through which the cooling air flows out from the casing 22c. The casing 23c includes: an inlet 23d through which the cooling air flows into the casing 23c; and an outlet 23e through which the cooling air flows out from the casing 23c. The inlet 22d is provided at a second vehicle width direction side portion (in the present embodiment, a right portion) of the casing 22c, and the inlet 23d is provided at a second vehicle width direction side portion (in the present embodiment, a right portion) of the casing 23c. The outlet 22e is provided at a first vehicle width direction side portion (in the present embodiment, a left portion) of the casing 22c, and the outlet 23e is provided at a first vehicle width direction side portion (in the present embodiment, a left portion) of the casing 23c.

An air cleaner 41 is arranged at the second vehicle width direction side of the second battery unit 23, and a cooling fan 42 is connected to a front side of the air cleaner 41. The air cleaner 41 and the cooling fan 42 are arranged at the second vehicle width direction side (in the present embodiment, the right side) of the rear frame 13 located at the second vehicle width direction side (in the present embodiment, the right side), that is, the air cleaner 41 and the cooling fan 42 are arranged at the vehicle width direction outer side. An inlet duct 43 extends from a first vehicle width direction side portion (in the present embodiment, a left side portion) of the cooling fan 42. The inlet duct 43 branches, and two branched end portions thereof are respectively connected to the inlet 22d of the first battery unit 22 and the inlet 23d of the second battery unit 23.

When the cooling fan 42 operates, outside air is taken into the air cleaner 41, and the air cleaned by the air cleaner 41 is discharged from the cooling fan 42. The air from the cooling fan 42 flows through the duct into the casing 22c of the first battery unit 22 and also into the casing 23c of the second battery unit 23. The cooling fan 42 takes the air from the rear side and discharges the air toward the first vehicle width direction side (in the present embodiment, the left side). Therefore, a sirocco fan is suitably applicable.

The air which has flowed into the casing 22c flows inside the casing 22c in the vehicle width direction from the inlet 22d toward the outlet 22e, and the air which has flowed into the casing 23c flows inside the casing 23c in the vehicle width direction from the inlet 23d toward the outlet 23e. In this process, the cooling air flows in the vehicle width direction toward the battery 22b in the casing 22c and the battery 23b in the casing 23c. Thus, the cooling air exchanges heat with the batteries 22b and 23b, so that the batteries 22b and 23b are cooled down by the air. As above, since the batteries 22b and 23b can be cooled down by the air as above, performance degradations of the batteries 22b and 23b can be prevented.

Two branched upwind end portions of an outlet duct 44 are respectively connected to the outlet 22e of the first battery unit 22 and the outlet 23e of the second battery unit 23. The branched end portions join together at a downwind side, and a downwind end portion of the outlet duct 44 is open in the vicinity of the inverter 21. As above, the cooling air line 40 is constituted by the air cleaner 41, the cooling fan 42, the inlet duct 43, the casing 22c of the first battery unit 22, the casing 23c of the second battery unit 23, and the outlet duct 44. When the cooling air flows through the batteries 22b and 23b, the cooling air flows along the cooling air line 40 from the second vehicle width direction side (in the present embodiment, the right side) toward the first vehicle width direction side (in the present embodiment, the first vehicle width direction side). Then, the air having exchanged heat with the batteries 22b and 23b is blown to the inverter 21 from the outlet duct 44.

The inverter 21 is a device which tends to become higher in temperature than the batteries 22b and 23b. Therefore, even the air having exchanged heat with the batteries 22b and 23b can suitably cool down the inverter 21. In contrast, in a case where the inverter 21 is primarily cooled down by the air, and the batteries 22b and 23b are secondarily cooled down by the air having cooled down the inverter 21, the air heated by the inverter 21 is blown to the batteries 22b and 23b, so that the batteries 22b and 23b may not be suitably cooled down. However, the present embodiment can avoid such a case. The cooling air flows along the cooling air line from the second vehicle width direction side (in the present embodiment, the right side) to the first vehicle width direction side (in the present embodiment, the left side), and the inverter 21 is arranged at the first vehicle width direction side of the first and second battery units 22 and 23. Therefore, the inverter 21 is arranged at a downwind side of the cooling air line 40, so that this air-cooling system is realized.

In the present embodiment, an electric component 35 is arranged in the vicinity of the inverter 21, and as with the inverter 21, the electric component 35 is arranged at the first vehicle width direction side (in the present embodiment, the left side) of the first and second battery units 22 and 23. For example, the electric component 35 includes a control board configured to control the inverter 21. The air having exchanged heat with the battery 22 can also be blown to this electric component from the outlet duct 44. Thus, the electric component 35 can be cooled down by the air together with the inverter 21.

The present invention is not limited to the above-described embodiment, and modifications, additions, and eliminations may be made within the scope of the present invention.

Figure 3:
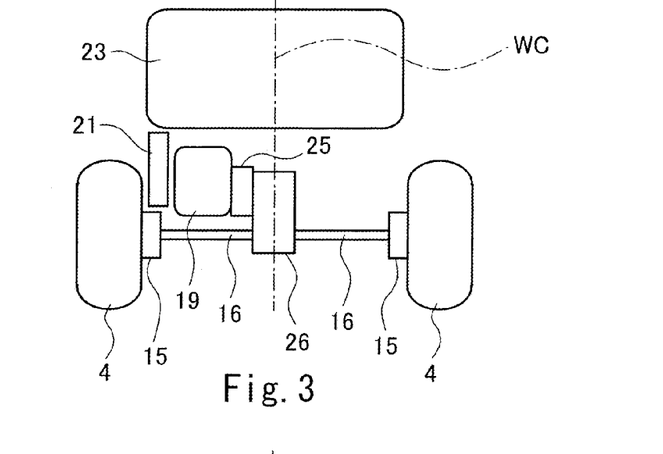
FIG. 3 is a plan view showing a vicinity of driving wheels of the utility vehicle according to a Modification Example 1 of the embodiment of the present invention.
Figure 4:
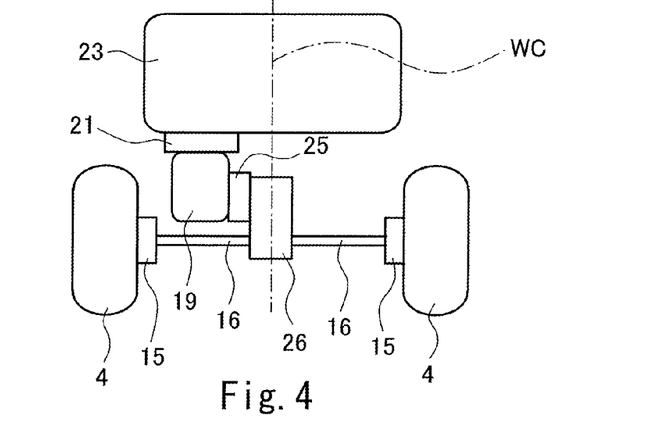
FIG. 4 is a plan view showing the vicinity of the driving wheels of the utility vehicle according to a Modification Example 2 of the embodiment of the present invention.
Figure 5:
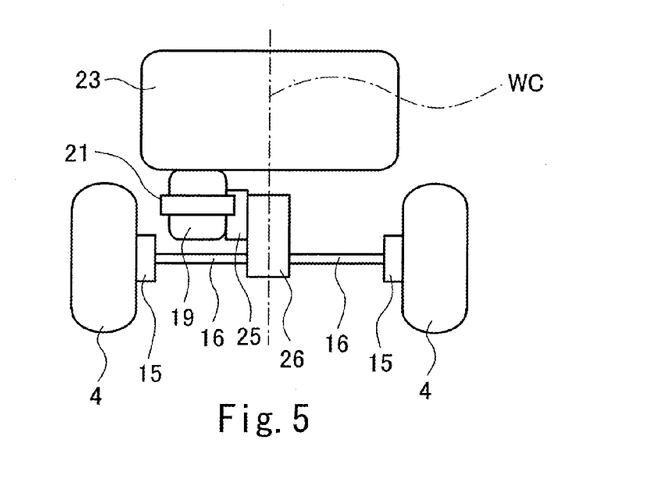
FIG. 5 is a plan view showing the vicinity of the driving wheels of the utility vehicle according to a Modification Example 3 of the embodiment of the present invention.

FIGS. 3 to 5 are plan views showing the vicinities of the driving wheels of the utility vehicles 1 according to Modification Examples 1 to 3 of the embodiment of the present invention. As shown in FIGS. 3 to 5, the arrangement of the power unit and the batteries is not limited to the arrangement of the above embodiment, and suitable modifications may be made within the scope of the present invention.

In the above embodiment, the inverter 21 is arranged at the first vehicle width direction side of the battery unit 23 and in front of the rear wheels 4. However, as shown in FIGS. 3 to 5, the inverter 21 may be arranged behind the battery unit 23. In this case, as shown in FIG. 3, the inverter 21 may be arranged at the first vehicle width direction side of the electric motor 19. As shown in FIG. 4, the inverter 21 may be arranged between the electric motor 19 and the battery unit 23 in the forward and rearward direction. As shown in FIG. 5, the inverter 21 may be arranged so as to overlap the electric motor 19 in the upper-lower direction. In any case, in Modification Examples 1 to 3, the first differential device 26, the driving power transmission 25, and the electric motor 19 are lined up linearly in the vehicle width direction, and the electric motor 19 is located at the first vehicle width direction side of the vehicle width center. The inverter 21 is located at the first vehicle width direction side as the electric motor 19, and the same operational advantages as the above embodiment can be obtained.

In the above embodiment, two battery units can be individually mounted on the vehicle. However, the number of battery units is not especially limited, and two battery units may be formed integrally. The above embodiment is applied to the vehicle which can switch between four-wheel driving and two-wheel driving. However, the present invention is also applicable to a vehicle which drives only the rear wheels and does not drive the front wheels. In this case, the power distributer 29 and the drive shaft 30 in the above embodiment are unnecessary. In addition, the position of the power unit is not limited to the rear portion of the vehicle body. For example, the power unit may be arranged at the front portion of the vehicle body for driving the front wheels.

In the above embodiment, the electric vehicle according to the present invention is applied to the utility vehicle 1. However, the present invention is applicable to not only the utility vehicle but to also an electric vehicle including left and right driving wheels. The present invention is also applicable to an electric three-wheeled vehicle including only one driven wheel. Further, the present invention is applicable to a vehicle which can travel by driving force of an electric motor. Therefore, the present invention is also applicable to a hybrid vehicle including an electric motor as a part of a driving power source. It should be noted that the present invention is suitably applicable to a genuine electric vehicle which does not include a driving power source other than the electric motor.

INDUSTRIAL APPLICABILITY

The present invention achieves the operational advantages of being able to compactly arrange the power unit (the unit constituted by the electric motor, the driving power transmission, the differential device, and the like) and shorten the wires connecting the electric devices to one another. Thus, it is useful to apply the present invention to an electric vehicle including a power unit having the above configuration.

REFERENCE CHARACTER LIST

WC vehicle width center
1 utility vehicle (electric vehicle)
2 vehicle body
3 front wheel (additional driving wheel)
4 rear wheel (driving wheel)
4a inner surface
18 leaf spring
19 electric motor
21 inverter
22, 23 battery unit
22b, 23b battery
25 driving power transmission
26 first differential device
27 second differential device
29 power distributer
30 drive shaft
35 electric component
40 cooling air line

The invention claimed is:

1. An electric vehicle comprising:
an electric motor configured to generate driving force to rotate left and right driving wheels;
a battery as a power supply for the electric motor;
an inverter configured to supply AC power to the electric motor;
a differential device arranged between the left and right driving wheels; and
a driving power transmission configured to transmit the driving force, generated by the electric motor, to the differential device, wherein:
the differential device, the driving power transmission, and the electric motor are lined up linearly in a vehicle width direction;
the electric motor is located at a first vehicle width direction side of a vehicle width center of the vehicle;
the inverter is located at the first vehicle width direction side of the vehicle width center of the vehicle;
at least a part of the inverter projects further toward the first vehicle width direction side than an inner surface of a driving wheel located at the first vehicle width direction side, out of the left and right driving wheels; and
the battery is located at a second vehicle width direction side of the inverter, is adjacent to the inverter, and is arranged between the left and right driving wheels in the vehicle width direction.

2. The electric vehicle according to claim 1, wherein the battery is adjacent to the electric motor in a forward and rearward direction and adjacent to the inverter in the vehicle width direction.

3. The electric vehicle according to claim 1, further comprising:
an additional wheel spaced apart from the left and right driving wheels in a forward and rearward direction;
a power distributer configured to distribute the driving force, generated by the electric motor, to the additional wheel; and
a drive shaft through which the driving force, taken out by the power distributer, is transferred to the additional wheel, wherein:
the power distributer is arranged at a second vehicle width direction side of the differential device; and
the drive shaft is located at a second vehicle width direction side of the vehicle width center and extends in the forward and rearward direction from the power distributer toward the additional wheel.

4. The electric vehicle according claim 1, wherein the left and right driving wheels are connected to a vehicle body via leaf springs respectively located at both vehicle width direction sides and extending in a forward and rearward direction.

5. The electric vehicle according to claim 1, wherein:
the left and right driving wheels are left and right rear wheels;
a front end of the electric motor is located in a vicinity of front end portions of the rear wheels; and
a rear end of the battery is located in the vicinity of the front end portions of the rear wheels.

6. The electric vehicle according to claim 1, further comprising a cooling air line through which cooling air flows toward the battery in the vehicle width direction.

7. The electric vehicle according to claim 6, wherein:
the cooling air flows along the cooling air line from a second vehicle width direction side to the first vehicle width direction side;
the inverter is located at a first vehicle width direction side of the battery and is adjacent to the battery; and
the inverter is arranged at a downwind side of the battery in a flow direction of the cooling air.

8. The electric vehicle according to claim 7, wherein an electric component is arranged at the first vehicle width direction side of the battery and is adjacent to the inverter.

9. The electric vehicle according to claim 1, wherein the electric motor is arranged above axles of the driving wheels.

10. The electric vehicle according to claim 1, wherein the battery is arranged above the electric motor.

11. The electric vehicle according to claim 1, wherein:
the left and right driving wheels are left and right rear wheels; and
the electric motor drives the left and right rear wheels.

12. The electric vehicle according to claim 11, wherein the electric motor is arranged in front of axles of the left and right rear wheels.

13. The electric vehicle according to claim 12, further comprising a cargo bed configured to bank.

14. The electric vehicle according to claim 1, wherein the inverter is provided separately from the electric motor.

15. An electric vehicle comprising:
an electric motor configured to generate driving force to rotate left and right driving wheels;
a battery as a power supply for the electric motor;
an inverter configured to supply AC power to the electric motor;
a differential device arranged between the left and right driving wheels;
a driving power transmission configured to transmit the driving force, generated by the electric motor, to the differential device;
an additional wheel spaced apart from the left and right driving wheels in a forward and rearward direction;
a power distributer configured to distribute the driving force, generated by the electric motor, to the additional wheel; and
a drive shaft through which the driving force, taken out by the power distributer, is transferred to the additional wheel, wherein:
the differential device, the driving power transmission, and the electric motor are lined up linearly in a vehicle width direction;
the electric motor is located at a first vehicle width direction side of a vehicle width center of the vehicle;
the inverter is located at the first vehicle width direction side of the vehicle width center of the vehicle;
the power distributer is arranged at a second vehicle width direction side of the differential device; and
the drive shaft is located at a second vehicle width direction side of the vehicle width center and extends in the forward and rearward direction from the power distributer toward the additional wheel.

* * * * *